(12) United States Patent
Porter

(10) Patent No.: X9717
(45) Date of Patent: Jun. 11, 1836

(54) HORSE POWER

(76) Inventor: Rufus Porter

United States Patent

Patent No.: X9717

Rufus Porter of Billerica [illegible] Massachusetts

Letters Patent.

The Schedule referred to in these Letters Patent and making part of the same, containing
a description in the words of the said Rufus Porter himself of his improvement
"in the Portable Horse Power"

To all to whom these presents shall come. Be it known that I Rufus Por-
ter of Billerica in the County of Middlesex and State of Massachusetts have
invented a new and useful Portable Horse Power or machine for the purpose of ap-
plying the Power of a Horse to other machinery. and that the following is a full
and exact description of the construction and operation of said Machine as
invented by me. A belt floor (or endless floor) is composed of seventeen
pieces of Plank. each plank being eighteen inches long twelve inches wide and
one inch thick. which planks are connected together by the following method:
On one side of each plank are two cleats secured to the plank by nails or screws
each cleat being one foot in length. three inches wide and one inch thick. the
outward edge of each cleat being within one fourth of an inch of the end of the plank
and to this outward edge is a strap of iron attached by screws each strap being
thirteen inches long one and one fourth inch wide and one fourth of an inch
thick. the strap being wider than the thickness of the cleat. a rabbit is cut
in the end of the plank to accommodate one edge of the strap. that the other edge
may be even with the face of the cleat. through each end of each strap is
a round hole half an inch in diameter. the centres of the holes being parallel with
the edges of the the plank. the edges of each two planks being placed in con
tact. (the ends of the straps passing a little by each other that the holes of each
two may come together) a half inch iron rod twenty one inches long is passed through
the ends of each four straps: thus connecting together the planks by hinge joints
On each end of each rod outside of the straps, is a small iron wheel four
inches in diameter and one inch thick which is secured on the rod by a pin
passing through the end of the rod outside of the wheel. All the planks hav-
ing been placed side by side and connected as above described: the two outside
planks are then brought together and likewise connected. thus forming a belt
or endless floor. This floor is supported by frame [illegible] of the following description.

Two sills each eight feet and six inches long three inches wide and two inches
thick are placed on the ground parallel to each other and being eighteen inches
apart are connected by two or more cross timbers which are tenoned to each sill.
Directly over and twenty two inches above the sills are two plates of the same
dimensions as the sills. Each plate is supported by three posts which are tenoned
both to the sills and to the plates two of them being set thirteen inches from
the ends of the sills and the other in the center. These posts being four inches
wide and one and a half inches thick are set near the outward end of
the sills leaving a space twenty one inches between each post and its op-
posite. To the inside of each three posts a rail is attached by screws
or bolts the rail is three inches deep by one and a half inch thick
and each end after passing the post is turned curving downwards form-
ing a semicircle of thirteen inches diameter. These rails support a part of
the friction wheels of the belt floor while another part rests on the sills
below. The rails are fixed five inches below the plates and the length of them
must be sufficient to fill the space between the friction wheels on each side
of the floor. The frame is further supported by a plank eight inches
wide which passes from one center post to its opposite being tenoned
by double tenons to each immediately below the rails which are also thus
by supported. An iron shaft thirty inches in length passes horizon-
tally through the opposite posts at one end of the frame at a point central
to the motion of the parts of the floor as they pass over the curved ends of
the rails. This shaft is an inch and a half square, being rounded how-
ever where it passes through the posts and extending three inches beyond
the posts on each side for the purpose of receiving and carrying a gear or
band wheel. On this shaft inside of the posts are two spiders consisting of
four arms each, the ends of which arms being one foot distant from each
other and having corresponding notches in them take to the rods of the belt floor
inside of the straps thus receiving motion from the floor, which is com-
municated by the gear or band wheel to other machinery. When
the planks composing the floor are set in motion by the feet of the horse
each friction wheel in which its turn after rolling the length of the rail
descends and rolls back on the sill to the forward end where it rises

[illegible] occupies its place on the rails. The upper side of each rail [illegible]
[illegible] with a thin plate of iron and the wheels are guided on the rails
by a small square rod of iron being nailed on each rail also bending
over the [illegible] outsides of the track of the wheels. Each track of the
belt floor is sheathed by a piece of pine board three fourths of an
inch thick and of a length and breadth corresponding with those of
the planks being nailed on the upper or outward side of the planks. Six
stakes each being two inches square and six feet high are supported verti-
cally (three on each side of the frame) by staples or straps of iron which
are attached to the outward sides of the sills and of the plates. Four of
these stakes being at or near the four corners of the frame each three
of them support a side rail for the purpose of keeping the horse in place, while
he walks on the floor. the side rails consisting of pine boards six inches
wide being secured to the inside of the stakes and near the tops by screws.
Two other boards or planks are also attached to the insides of the stakes
immediately above the floor. the lower edges of the planks coming inside of
the wheels for the purpose of securing the wheels from damage by the feet of the
horse. Two cross bars each being two feet long and two inches square extend
across and are secured by bolts one to the two forward and the other to the
two back stakes about three feet above the level of the floor. one of these
serves for the draught of the horse and the other for holding back. Note.
That end of the machine in which the shaft is situated is called the for-
ward end. From each end of each cross bar a small brace extends to the
point of contact of the centre stakes and the plate, the ends of the braces rest-
ing on the plate and bearing against the stakes effectually support the
upper work in sustaining the draught of the horse. The stakes and other
upper work may be readily taken down occasionally for the greater con-
venience in moving the machine from place to place
The points which I claim as original are. the application of the friction
wheel to a belt floor composed of planks the method of securing them on
straps by means of cleats and the application of [illegible] instead of wheels or Exd
cylinders 119

Witnesses { Stephen T. Peeler
Reuben H. [illegible]

[illegible] Peeler

[illegible]